United States Patent
Ford (10) Patent No.: US 9,912,175 B2
(45) Date of Patent: Mar. 6, 2018

(54) BATTERY HARVESTER

(71) Applicant: 9609385 CANADA INC., Beaconsfield (CA)

(72) Inventor: Timothy D. F. Ford, Beaconsfield (CA)

(73) Assignee: 9609385 CANADA INC., Beaconsfield (CA)

( * ) Notice: Subject to any disclaimer, the term of this patent is extended or adjusted under 35 U.S.C. 154(b) by 450 days.

(21) Appl. No.: 14/482,653

(22) Filed: Sep. 10, 2014

(65) Prior Publication Data

US 2014/0375252 A1    Dec. 25, 2014

Related U.S. Application Data (63) Continuation-in-part of application No. 13/091,719, filed on Apr. 21, 2011, now Pat. No. 9,413,181.

(60) Provisional application No. 61/327,165, filed on Apr. 23, 2010, provisional application No. 61/881,515, filed on Sep. 24, 2013, provisional application No. 61/875,767, filed on Sep. 10, 2013.

(51) Int. Cl.
*H02J 7/00* (2006.01)

(52) U.S. Cl.
CPC .......... *H02J 7/0003* (2013.01); *H02J 7/0013* (2013.01); *H02J 7/0045* (2013.01); *H02J 7/0054* (2013.01); *Y10T 307/625* (2015.04)

(58) Field of Classification Search
CPC ...... H02J 7/0013; H02J 7/0026; H02J 7/0031; H02J 7/0034; H02J 7/0042; H02J 7/0045; H02J 7/0054; H02J 7/0068; H01M 2/342; H01M 2200/30; H01M 10/4207; H01M 10/4221

USPC .......................................... 320/103–104, 110
See application file for complete search history.

(56) References Cited

U.S. PATENT DOCUMENTS

| | | | |
|---|---|---|---|
| 3,579,075 A | | 5/1971 | Floyd |
| 3,930,889 A | | 1/1976 | Ruggiero et al. |
| 4,303,876 A | | 12/1981 | Kelly, III et al. |
| 5,015,546 A | | 5/1991 | Dulaney et al. |
| 5,543,702 A | * | 8/1996 | Pfeiffer .................. H02J 7/0006 320/110 |
| 5,777,453 A | * | 7/1998 | Imanaga ............... H02J 7/0093 320/160 |
| 6,914,412 B2 | | 7/2005 | Wang et al. |
| 2002/0060550 A1 | * | 5/2002 | Pautet ................. H01M 2/1055 320/103 |
| 2006/0244421 A1 | * | 11/2006 | Narendran ............ H01M 10/42 320/132 |
| 2007/0247105 A1 | | 10/2007 | Krieger et al. |
| 2007/0257637 A1 | | 11/2007 | Hankel et al. |
| 2009/0096399 A1 | | 4/2009 | Chen et al. |

(Continued)

OTHER PUBLICATIONS

Juzkow, M. Development of a BB-2590/U rechargeable lithium-ion battery, Journal of Power Sources, vol. 80, Issues 1-2, Jul. 1999, pp. 286-292, ISSN 0378-7753. doi:10.1016/S0378-7753(99)00170-6.*

(Continued)

*Primary Examiner* — David V Henze-Gongola
(74) *Attorney, Agent, or Firm* — Hugh Mansfield (57) ABSTRACT

A universal battery harvester which harvests energy from a plurality of different batteries and stores the harvested energy in an onboard storage battery under control of a microprocessor.

12 Claims, 11 Drawing Sheets

(56) References Cited

U.S. PATENT DOCUMENTS

2010/0109605 A1   5/2010  Nakasho et al.
2011/0181242 A1*  7/2011  Lee ..................... H02J 7/0003
                                                      320/110

OTHER PUBLICATIONS

Nicholas Barry et al., "Supercharged Battery Scavanger", Proceedings of the National Conference on Undergraduate Research (NCUR) 2006, The University of North Carolina at Asheville, Apr. 6-8, 2006.

* cited by examiner

BATTERY HARVESTER

CROSS REFERENCE TO RELATED APPLICATIONS

This application is a Continuation-in-Part (CIP) application of U.S. patent application Ser. No. 13/091,719, now pending, filed on Apr. 21, 2011 and which claims priority on U.S. provisional application Ser. No. 61/327,165, filed on Apr. 23, 2010.

This application also claims priority on U.S. provisional application Ser. No. 61/875,767, filed on Sep. 10, 2013 and of U.S. provisional application Ser. No. 61/881,515, filed on Sep. 24, 2013.

All documents above are incorporated herein in their entirety by reference.

FIELD OF THE INVENTION

The present invention relates to a device for harvesting batteries. In particular, the present invention relates to a device which is able to harvest energy from a variety of different source into an onboard battery and charge a variety of devices using the harvested energy.

BACKGROUND

The prior art discloses circuits for recovering energy from partially spent batteries, generally referred to as scavenger circuits. One drawback of such prior art devices is that they are limited to recovering energy from a single source voltage or battery type, thereby greatly limiting their use in the field. Another drawback is that the recovered energy can only be used to recharge batteries of a single battery, again thereby greatly limiting their use in the field.

SUMMARY OF THE INVENTION

In order to address the above and other drawbacks there is provided a device for selectively harvesting energy from a plurality of energy sources including at least one battery. The device comprises at least one battery compartment, each of the compartments configured for receiving one of the at least one battery, the received battery having an output voltage, an onboard battery, and a microprocessor powered by the onboard battery. If the output battery voltage is of a first polarity, the received battery is discharged into the onboard battery under control of the microprocessor and wherein if the output battery voltage is of a second polarity, the received battery is charged from the on board battery under control of the microprocessor.

There is also provided a device for harvesting energy from a plurality of batteries, each of the batteries of a different battery type. The device comprises a plurality of compartments, each of the compartments configured for receiving the plurality of different battery types, and an onboard battery, wherein each of the batteries is discharged into the onboard battery.

Also, there is provided a method for selectively discharging or recharging a battery. The method comprises connecting the battery between a pair of contacts, and determining an orientation of the battery between the pair of contacts. When the battery is in a first orientation the battery is discharged to a second battery and when the battery is in a second orientation the battery is recharged by the second battery.

There is additionally provided a device for determining a length of an elongate cylindrical battery having a positive pole and a negative pole. The device comprises an elongate compartment for receiving the battery and comprising a fixed contact at a first end, a moveable contact configured for sliding along an axis between a second end of the compartment and the first end, an electronic circuitry connected between the fixed contact and the moveable contact and comprising a resistance having a value varying with a change in position of the moveable contact along the axis, and a spring for biasing the moveable contact towards the first end. When the battery is placed into the compartment, each of the poles comes into contact with a respective one of the fixed contact and the moveable contact and the electronic circuitry converts the value into the length.

DETAILED DESCRIPTION OF THE ILLUSTRATIVE EMBODIMENTS

Figure 1A:
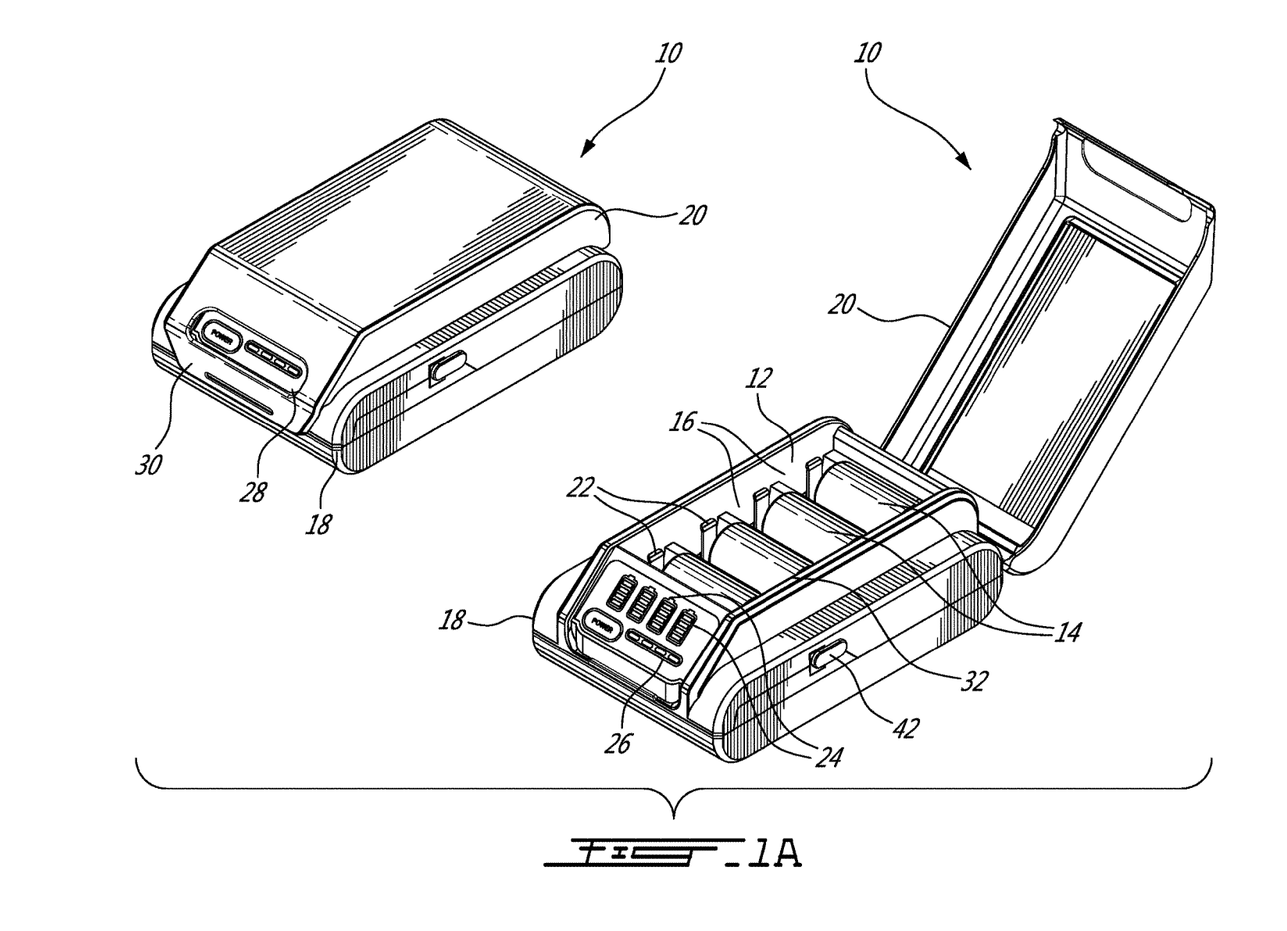
FIG. 1A provides a left front raised perspective view of a battery harvester with the cover closed and open and in accordance with an illustrative embodiment of the present invention.

Referring now to FIG. 1A, a battery harvester in accordance with an illustrative embodiment of the present invention will now be described. The battery harvester, generally referred to using the reference numeral 10, comprises an opening 12 for receiving a plurality of batteries 14 therein. Illustratively, the opening 12 is divided into four (4) compartments 16 for receiving up to four (4) batteries as in 14 therein. The compartments 16 are moulded or otherwise formed in the non-conductive housing 18 although in a particular embodiment fewer or more such compartments could be provided. The compartments are enclosed by a cover 20, hinged at one end, which ensures the batteries as in 14 are retained within their respective compartment 16 and also limits the egress of water, dirt and the like into the opening 12. The sub-compartments 16 are sized such that they may receive a variety of battery sizes such as AA, AAA, C, CR123, 17670 and the like. In order to accommodate the differing lengths of the batteries as in 14, a spring biased moveable conductive contact plate 22 is provided which is moveable within each compartment 16. A fixed contact plate (not shown) is positioned at an end of the compartment 16 opposite that of the movable conductive contact plate 22.

Still referring to FIG. 1A, LED displays as in 24 provides visual indication of the status of each the batteries as in 14 within their respective compartments 16. An additional LED display 26 provides a visual indication of the status of the onboard battery (not shown). As will be discussed in more detail below, a visual indication can also be provided to indicate whether the particular battery is in the process of being charged or harvested, for example by changing the color of the light emitted by the LEDs or the like, for example green light indicating charging and red light indicating harvesting, or selectively illuminating the elements of the LED displays such that the display appears to be repeatedly filling up (for example indicating charging) or emptying (for example indicating discharging). A window 28 in the cover 20 makes provision for viewing the additional LED display 26 when the cover 20 is in the closed position. A lip portion 30 at the end of the cover 20 engages the housing 18 such that the cover 20 is held closed. A rubber (santoprene) seal 32 is provided between the cover 20 and the housing 18 to limit the egress of water, dirt and the like into the opening 12.

Figure 1B:
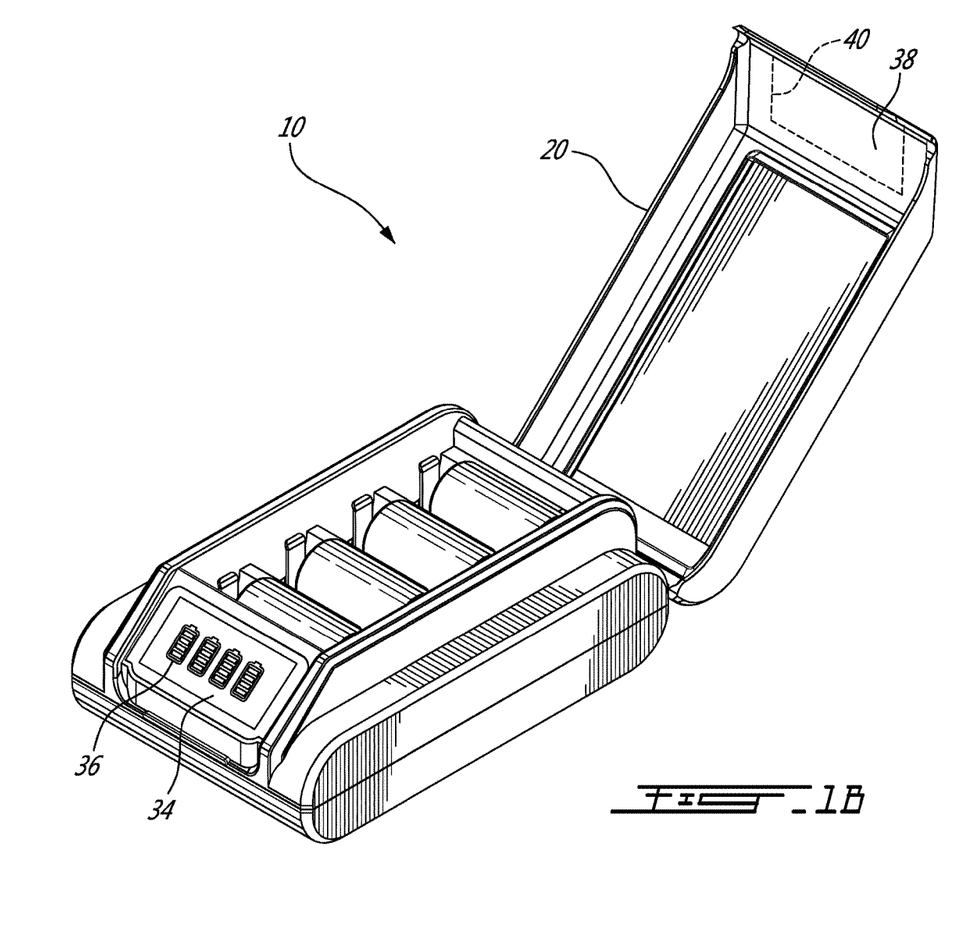
FIG. 1B provides a left front raised perspective view of a battery harvester with the cover open and in accordance with an alternative illustrative embodiment of the present invention.

Referring to FIG. 1B, in an alternative embodiment the LED displays 24, 26 are replaced with a Thin Film Transistor (TFT) type touch screen display 34 which is used to display graphics such as icons 36 and the like. In a particular embodiment the information displayed graphics is the same as that displayed by the LED displays 24, 26 in FIG. 1A. In this embodiment, at least the forward portion 38 of the cover 20 which covers the touch screen display 34 when the cover 20 is in the closed position is transparent such that the touch screen display 34 is visible. Alternatively, the cover 20 comprises a screen sized cutaway 40 such that the touch screen display 34 remains exposed and accessible when the cover is in the closed position.

Figure 2A:
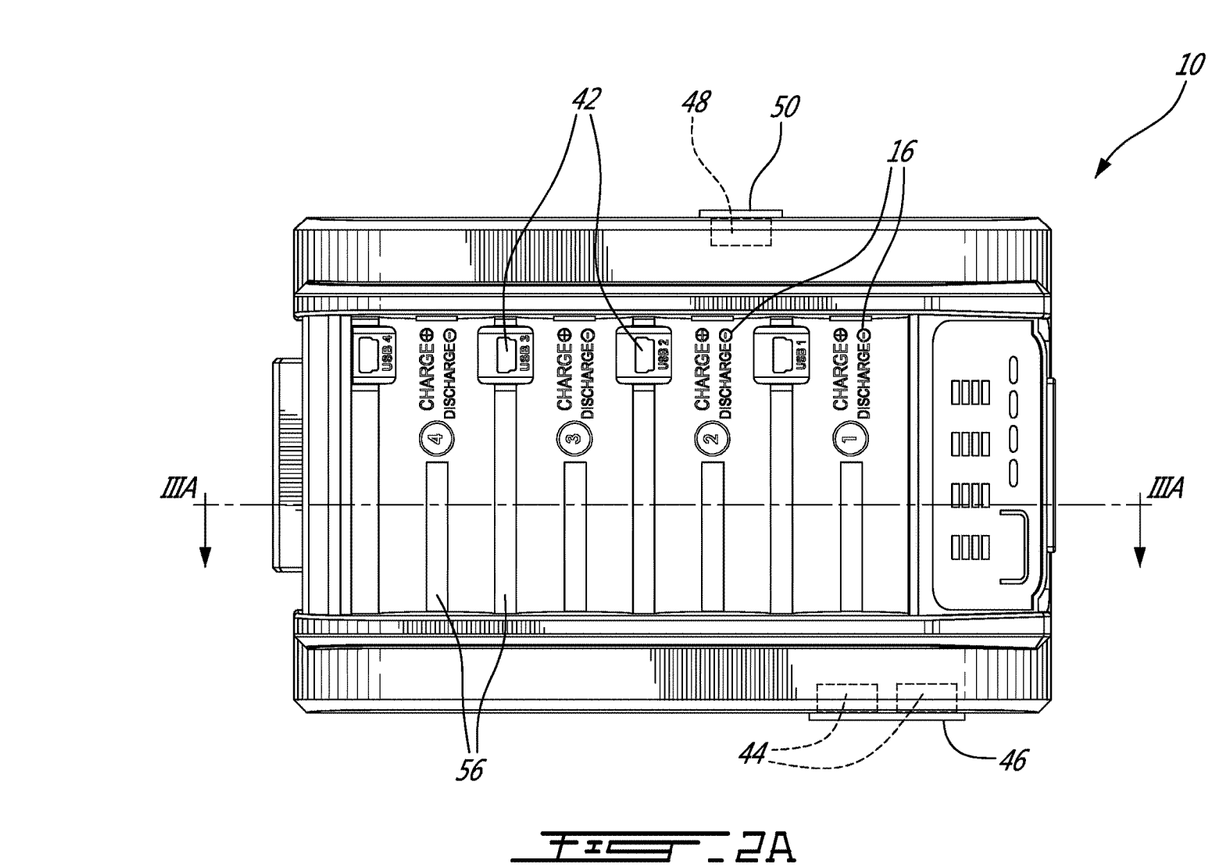
FIG. 2A provides a top plan view of a battery harvester in accordance with an illustrative embodiment of the present invention.

Referring now to FIG. 2A, each compartment 16 is further associated with a USB Mini-B type receptacle 42 for receiving a Mini-B type plug (not shown) therein, thereby allowing power from USB type devices such as a USB battery pack (also not shown) to be discharged into the system. A pair of Type A USB receptacles as in 44 are also provided which may be used to charge external devices with energy stored within the onboard battery and using an appropriate USB cable (not shown). A flexible cover 46 is provided to shield the USB receptacles 42 from moisture, dirt and the like. A universal input 48 is also provided illustratively for receiving a coaxial barrel connector (not shown) allowing the device to be powered using an external power supply (also not shown) such as large BB-2590 type batteries, solar cells, car adaptor, mains adaptor or the like. A flexible cover 50 (see also FIG. 1A) is also provided to shield the input from moisture, dirt and the like. Other connectors, such as multi-pin MIL spec connectors could also be provided in particular embodiments.

Figure 2B:
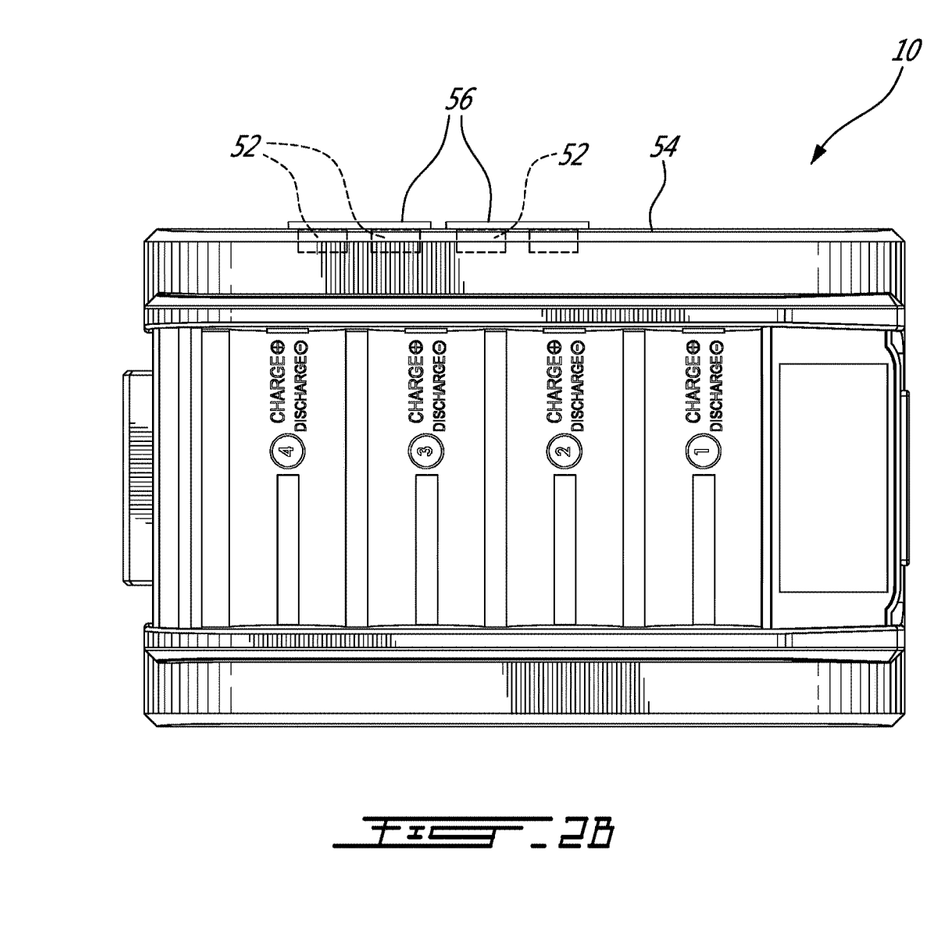
FIG. 2B provides a top plan view of a battery harvester in accordance with an alternative illustrative embodiment of the present invention.

Referring to FIG. 2B, in an alternative embodiment the USB Mini-B type receptacles as in 52 are provided not within the compartments as in 16 but rather on an exterior wall 54 of the battery harvester 10. Flexible covers as in 56 are also provided to shield the receptacles from moisture, dirt and the like.

Figure 3A:
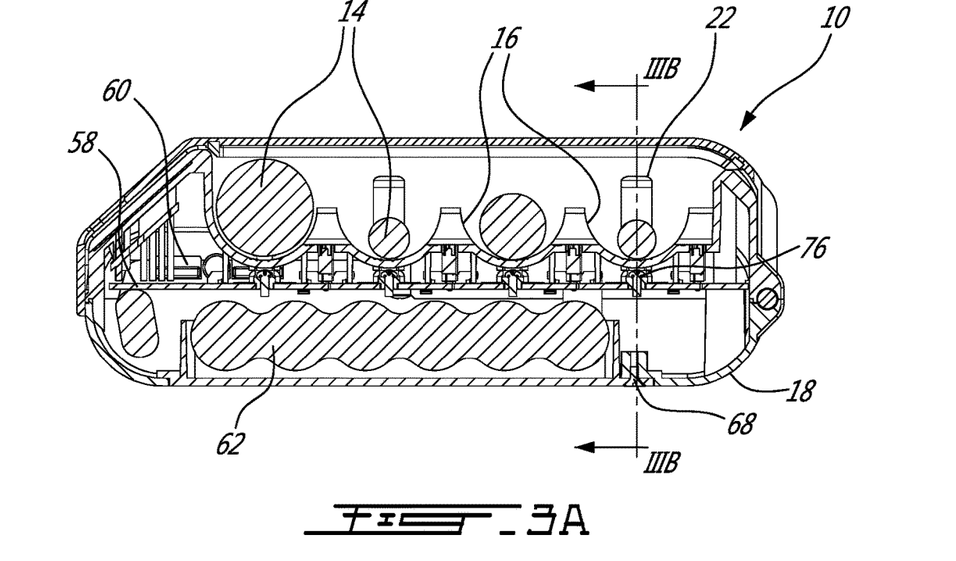
FIG. 3A provides a sectional view along line IIIA-IIIA in FIG. 2A.
Figure 3B:
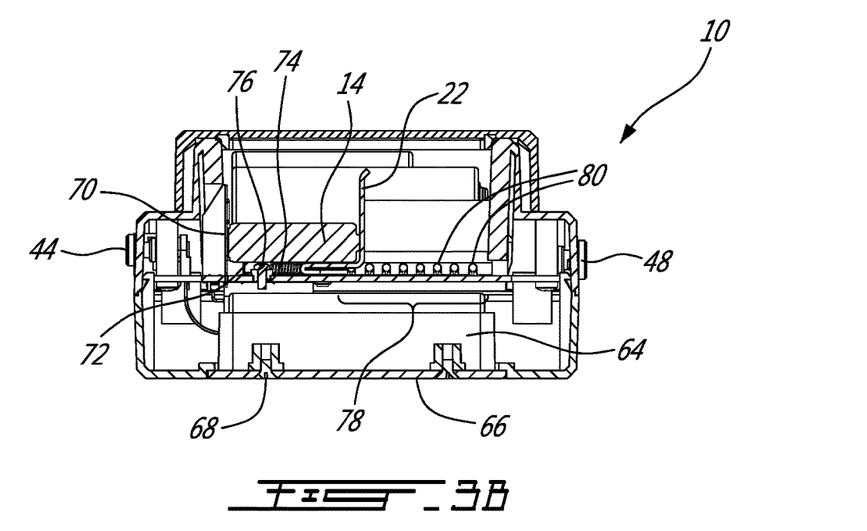
FIG. 3B provides a sectional view along line IIIB-IIIB in FIG. 3B.

Referring now to FIGS. 3A and 3B, the battery harvester 10 further comprises a printed circuit board 58 supporting electronics 60 and an onboard battery 62. The onboard battery 62 is illustratively a rechargeable Lithium Ion (Li-ion) type battery having a nominal output voltage of 3.6 volts, a capacity of 15.6 Ah and requiring a charge voltage of a maximum of 4.2V. It has a typical usable life of about 500 charge cycles. The onboard battery 62 provides the primary location for the storage of energy harvested from the batteries as in 14. Additionally, the onboard battery 62 powers the electronics 60 which, as will be discussed in more detail below, are used to harvest energy from attached sources and recharge batteries and other devices attached via the USB ports (reference 44 in FIG. 2A). The onboard battery 62 is retained within a compartment 64 accessible through a panel 66 in the underside of the housing 18. The panel 66 is removably secured against the underside of the housing 18 using a pair of screws as in 68.

Still referring to FIGS. 3A and 3B, in order to interconnect batteries as in 14 of different sizes placed within their respective compartments as in 16 such that they may be harvested or recharged, as discussed above a moveable conductive contact plate 22 and a fixed conductive contact plate 70 are provided. Each moveable conductive contact plate 22 is slideably retained within a channel 72 (see also FIG. 2) and a spring 74 is provided, one end of which is secured by a pin, rivet or screw 76 or the like in proximity to the fixed contact plate 70 and the other end of which is secured to the moveable plate 22, for biasing the moveable plate 22 towards the fixed plate 70. In order to provide information to the electronics 60 as to the length of the battery 14 within a given compartment as in 16, a light pipe 78 comprised of an array of infrared detector pairs 80 is provided. As will now be understood by a person of ordinary skill in the art, dependent on the length of the battery 14, and therefore the positioning of the movable plate 22, one or more of the infrared detector pairs 80 will be obscured by the movable plate 22.

Figure 3C:
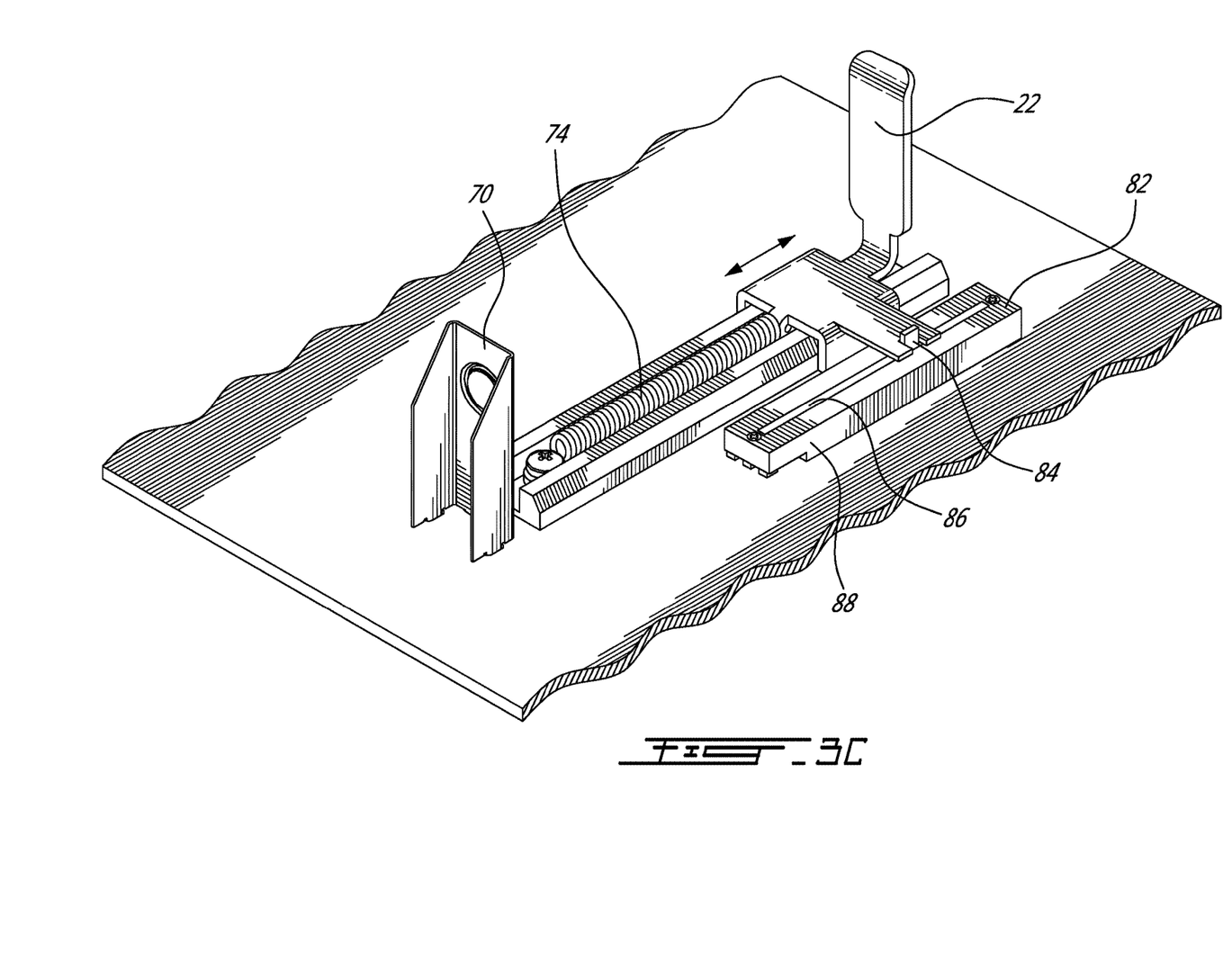
FIG. 3C provides a perspective view of a battery compartment in accordance with an alternative illustrative embodiment of the present invention.

Referring now to FIG. 3C, in an alternative embodiment, in order to provide information to the electronics 60 as to the length of the battery 14 within a given compartment as in 16, the moveable contact plate 22 is coupled to a variable resistance 82 comprised of slider 84 which moves with the contact plate 22. As the slider 84 moves within the slot 86 along the length of the resistance body 88 in response to the contact plate 22 being moved, the resistance measured at the output of the variable resistance 82 varies. Dependent on the length of the battery 14, and therefore the positioning of the movable plate 22 and the slider 84 within the slot 86, the measured resistance can be used to determined using a lookup table or a simple algorithm or the like. For example for a 10 k ohm variable resistance having a linear taper, i.e. where the resistance is proportional to the position of the slider 84 within the slot 86, the length of the battery can be determined according to the equation $AX+B$ where B is the length of the smallest distance between the moveable contact plate 22 and the fixed contact plate 70, X is the value of the variable resistance between 0 ohm and 10 k ohm and A, a constant which converts the measured resistance to the position of the slider 84 from its initial position.

Figure 4:
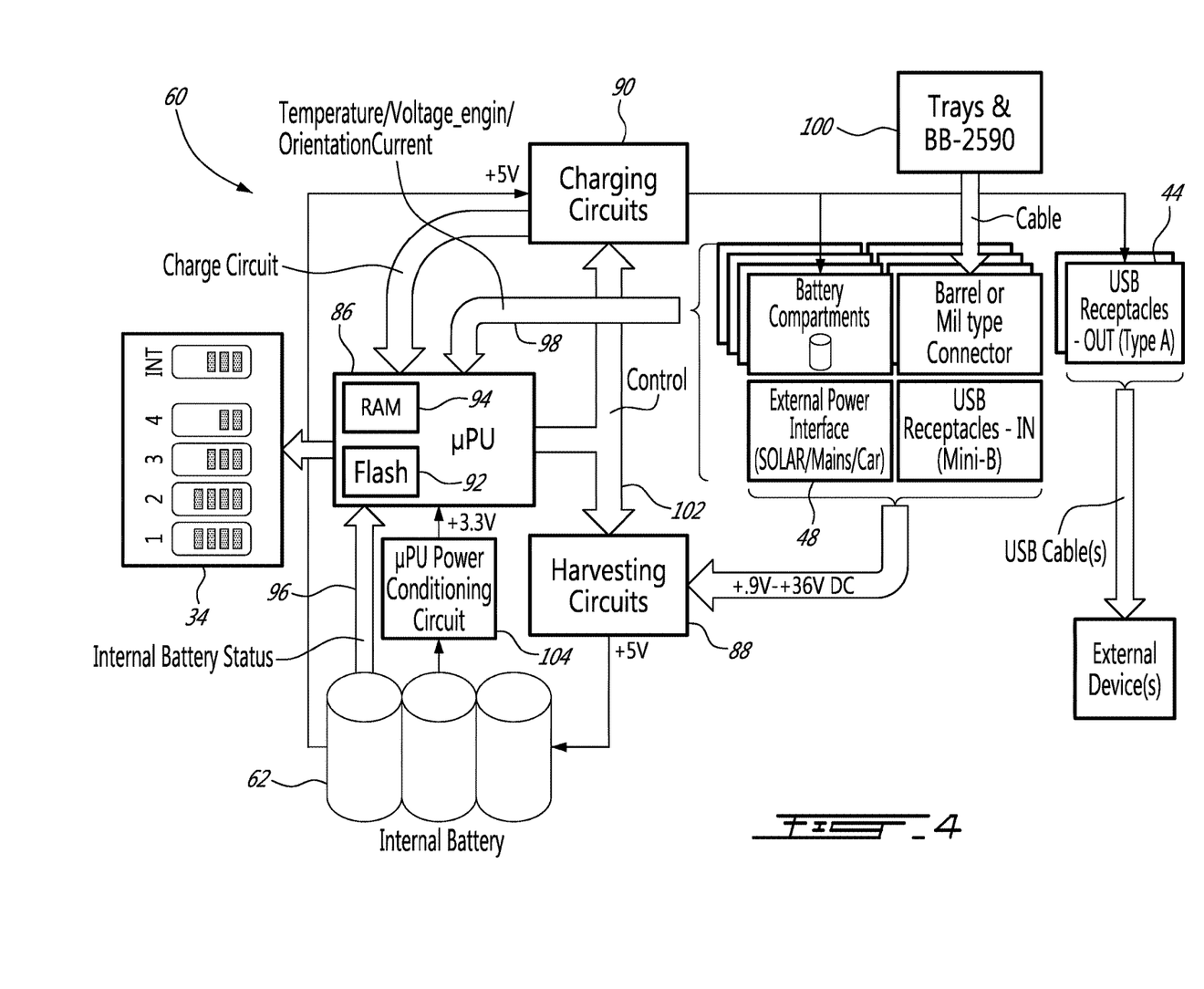
FIG. 4 provides a schematic diagram of the electronics of a battery harvester in accordance with an illustrative embodiment of the present invention.

Referring now to FIG. 4, the electronics 60 comprises a microprocessor 86, harvesting circuits as in 88, charging circuits as in 90, the internal reserve battery 62 for storing harvested energy and providing energy for powering the battery harvester 10 and, as discussed above, the TFT display as in 34. Using programs stored in flash memory 92, data stored in RAM 94, and various status information 96, 98, for example regarding the internal battery 62 and various status information of any batteries as in 14 found in one or other of the compartments, external devices 100 such as trays (discussed in more detail below), large batteries (all not shown) and the like, USB outputs as in 44 and/or other sources of power connected to the external power interface 48, the microprocessor 86 provides, as will be discussed in more detail below, control information 102 to the harvesting circuits as in 88 and the charging circuits as in 90.

Still referring to FIG. 4, the microprocessor 86 is supplied current via a power conditioning circuit 104. In order to ensure that sufficient power remains within the onboard battery 62 for powering the microprocessor 86, the microprocessor 86 periodically examines the detected status information 96 of the onboard battery 62 to ensure that a minimum charge is maintained. In the event that the onboard battery 62 is depleted such that the minimum charge is reached, the microprocessor 86 can selectively disable one or all of charging outputs, for example one or both of the Type A USB receptacles as in 44 and/or one or other of the charging circuits as in 90 which are currently charging a battery as in 14 in a battery compartment 16.

Figure 5:
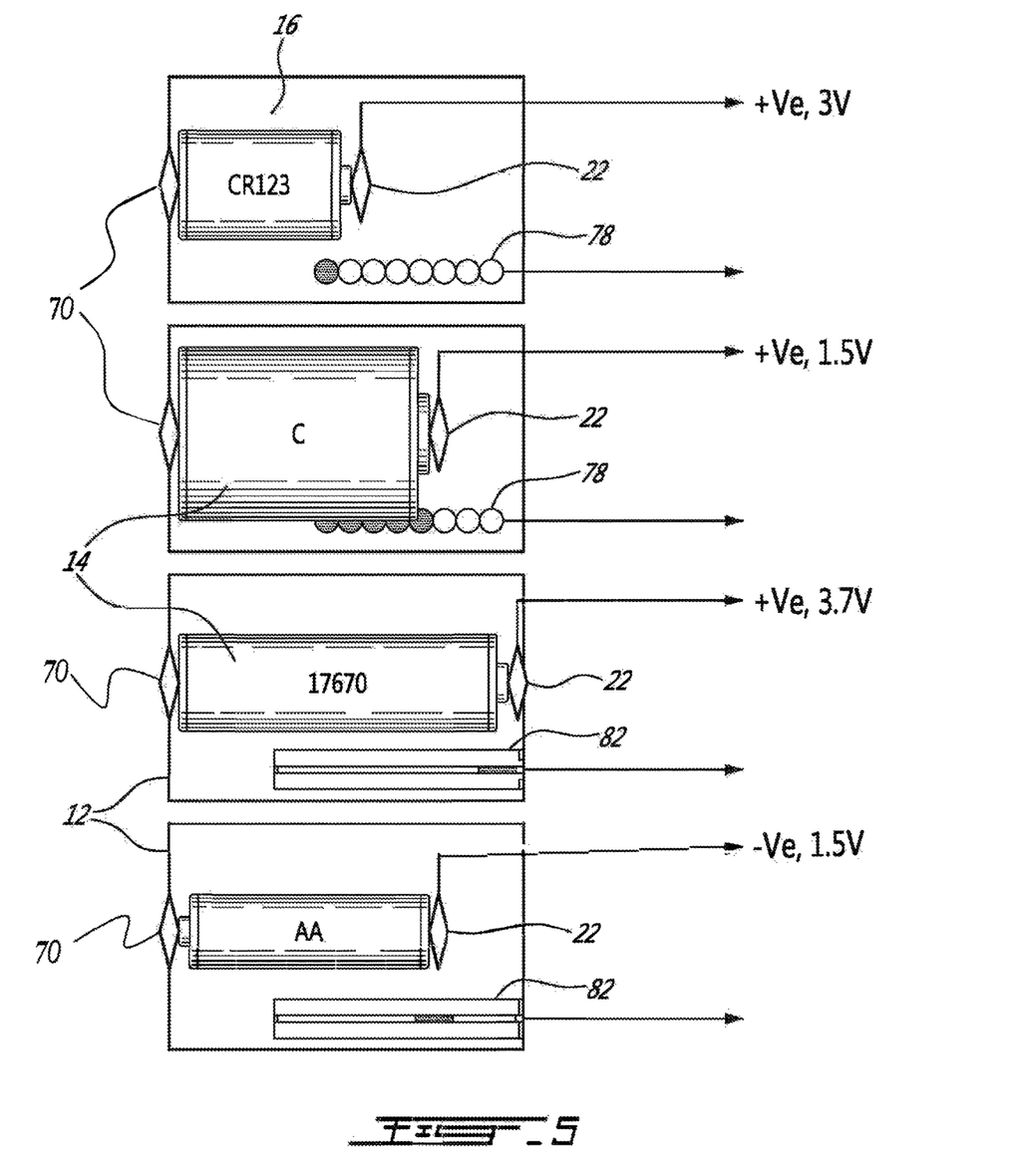
FIG. 5 provides a schematic diagram of battery type assessment in accordance with an illustrative embodiment of the present invention.

Referring now to FIG. 5 in addition to FIG. 4, as discussed above, each compartment as in 16 is suitable for receiving a cylindrical battery as in 14 of a plurality of different sizes. Additionally, as discussed above each compartment as in 16 is equipped with a light pipe as in 78 or a variable resistance 82 which is used for detecting the position of the moveable contact plate 22 and therefore the length of the battery as in 14. On detection, the length of the battery is compared to a look up table (not shown), illustratively stored in flash 92. The look up table comprises a cross reference of battery lengths versus type. Some examples of table entries are as follows:

| Type | Technology | Diameter(mm) | Length(mm) | Rating |
|---|---|---|---|---|
| C | NiMh/NiCad | 25 | 50 | 1.5 V |
| AA | NiMh/NiCad | 14 | 50.5 | 1.5 V |
| AAA | NiMh/NiCad | 10.5 | 44.5 | 1.5 V |
| 14500 | LiON | 14 | 50 | 3.6 V |
| 16340 | LiON | 16 | 34 | 3.6 V |
| 17335 | LiON | 17 | 33.5 | 3.6 V |
| 17500 | LiON | 17 | 50 | 3.6 V |
| 17670 | LiON | 17 | 67 | 3.6 V |
| 18490 | LiON | 18 | 49 | 3.6 V |
| 18650 | LiON | 18 | 65 | 3.6 V |
| 22650 | LiON | 22 | 65 | 3.6 V |
| 26650 | LiON | 26 | 65 | 3.6 V |

The length is used to predict the type of battery as in 14 which is being serviced in a given sub-compartment as in 16. In some cases, the output voltage and/or discharge current is also used to aid in determining the battery type, including chemistry (such as NiCad or NiMH or the like). For example, different battery chemistries have different internal impedances which can be detected and used to provide an indication of their chemistry. The battery type can be used to calculate an optimum charge or discharge rate, required voltage settings and the like.

In order to ensure that the battery harvester 10 is able to be updated, for example to provide updated lookup tables for new battery types or additional output voltages and/or discharge currents for aid in determining the battery type, the flash memory can be updated via an active one of the USB in receptacles as in 42. In this regard, a program is illustratively provided in the boot loader software in the flash memory to provide this function.

Still referring to FIG. 5, the orientation of the battery 14 within the compartment 16, illustratively detected by measuring the polarity of the voltage between the moveable contact plate 22 and the fixed contact plate 70, is used to determine whether the battery as in 14 within the particular compartment 16 should be harvested (i.e. discharged into the onboard battery) or charged. The harvesting and charging can be done independently, for example as illustrated that three (3) batteries are in harvesting mode (indicated by a positive voltage between the moveable contact plate 22 and the fixed contact plate 70) and one battery is in recharging mode (indicated by a negative voltage between the moveable contact plate 22 and the fixed contact plate 70).

Figure 6A:
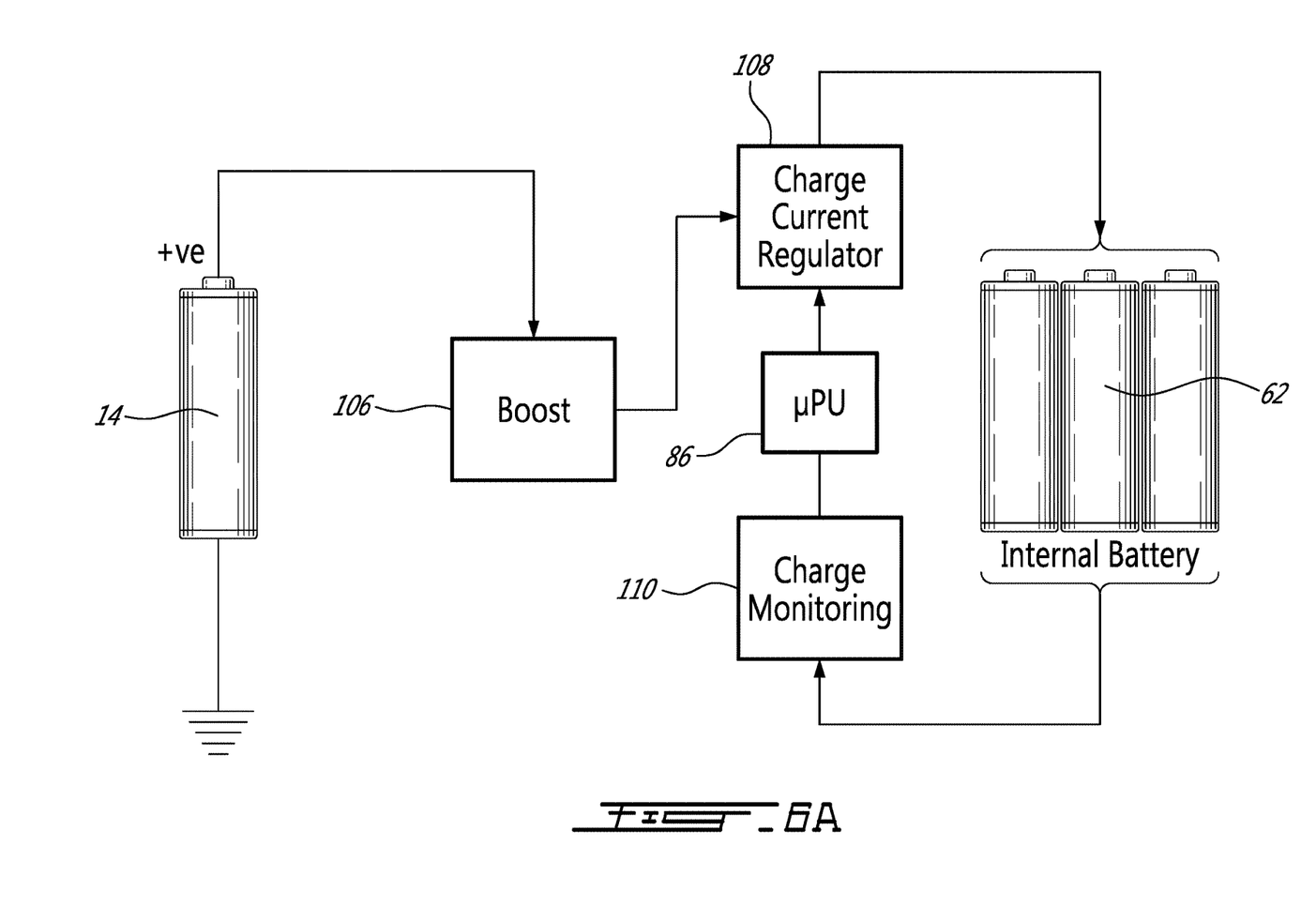
FIG. 6A is a schematic diagram of a harvesting circuit in accordance with an illustrative embodiment of the present invention.

Referring now to FIG. 6A, when a battery 14 is inserted into a respective one of the compartments in an orientation such that it is to be discharged, its output is boosted to illustratively 4.2V by a synchronous boost converter 106 and then supplied as a charging source to the internal battery 62 via a charge current regulator circuit 108. The charge current is continually monitored by a monitoring circuit 110 and used as feedback by the current regulator 108 for adjusting the charge current regulator to the set reference current by the microprocessor (μPU) 86. Indeed, in many cases the output of a partially discharged battery 14 may be insufficient on its own to charge the internal battery 62. This allows energy to be recovered from almost spent batteries 14 which would otherwise be lost.

Figure 6B:
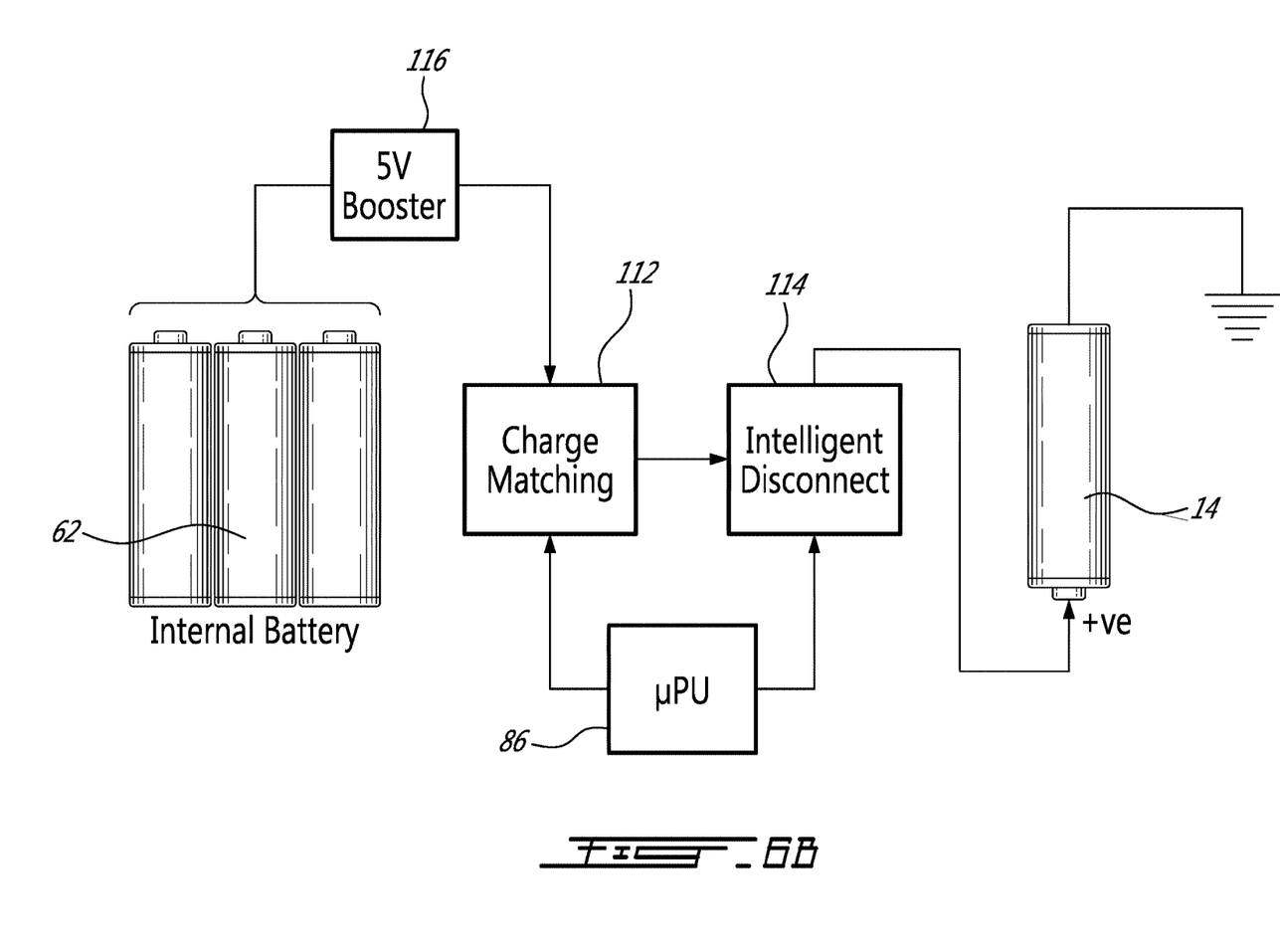
FIG. 6B is a schematic diagram of a recharging circuit in accordance with an illustrative embodiment of the present invention.

Referring now to FIG. 6B in addition to FIG. 4, when a battery 14 is inserted into a respective one of the compartments 16 its polarity and type is detected and, based on the detected values, used by the μPU 86 to determine preferred settings for recharging the battery 14. The μPU 66 uses the preferred settings to adjust a charge matching circuit 112 (the matching circuit acts as a charge current regulator) accordingly, and such that the current and voltage provided to the battery 14 is correct. In the event that the internal battery 62 is unable to provide sufficient current to recharge the battery 14, or the recharging circuit is directed to recharge external devices via the USB ports 44 (which illustratively have priority), the battery 14 is disconnected from the recharging circuit via an intelligent disconnect circuit 114. A 5V booster 116 is also provided to ensure that $V_{DD}$ is maintained relatively constant.

Figure 7:
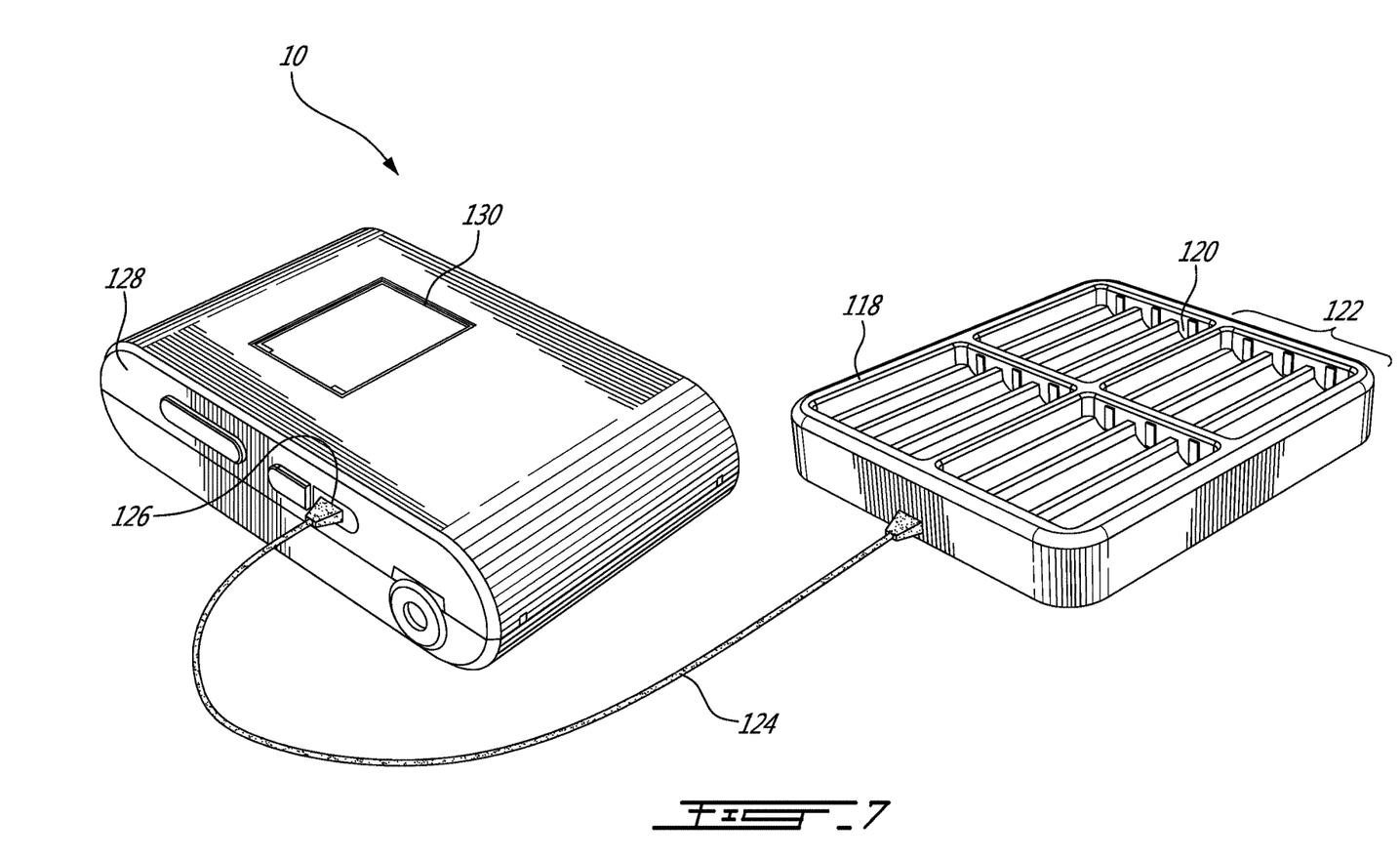
FIG. 7 is a raised left perspective view of a coverless battery harvester in accordance with a second alternative embodiment of the present invention.

Referring now to FIG. 7, in a second alternative embodiment of the battery harvester 10, the assembly comprises an additional tray component 118 comprising a plurality of compartments as in 120 which can receive a plurality of batteries (not shown). The compartments as in 120 are arranged into banks 122 which are each populated with a plurality of batteries. Illustratively the tray accepts 12 AA type batteries arranged into banks of three (3) and having a nominal bank voltage of 4.5V. The tray is connected to the battery harvester 10 via a flexible cable 124 and is input into the universal input 48 or one of a plurality of USB input ports as in 126 located on the side of the harvester housing 128. In this second alternative embodiment no battery receiving compartments are provided within the housing 128 of the harvester. A TFT type touchscreen 130 is provided on an upper surface to allow for control input and provide status information and the like.

Still referring to FIG. 7, in this manner a large number of batteries can be placed in the tray 118 and discharged at one time to replenish the internal battery of the harvester 10. Charge stored in the internal battery can be used to replenish the batteries of our power other devices attached to the harvester 10 via the output USB ports.

Still referring to FIG. 7, additionally trays as in 118 can be attached to the output USB port and rechargeable batteries placed in one or more of the banks 122 recharged simultaneously. In this regard, a detection circuit may be provided to determine if one or more of the banks as in 122 is full, and such that only the full banks are recharged. Similarly, the tray 118 can also be used to recharge batteries independent of the harvester 10 by attaching the tray 118 via the USB cable 124 to an appropriate wall mounted charging device (not shown).

Although the present invention has been described hereinabove by way of specific embodiments thereof, it can be modified, without departing from the spirit and nature of the subject invention as defined in the appended claims.

I claim:

1. A device for selectively harvesting energy from a plurality of energy sources including at least one battery, the device comprising:
    at least one battery compartment, each of said compartments configured for receiving one of the at least one battery, the received battery having an output voltage;
    an onboard battery; and
    a microprocessor powered by said onboard battery;
    wherein if the output battery voltage is of a first polarity, the received battery is discharged into said onboard battery under control of said microprocessor and wherein if said output battery voltage is of a second polarity opposite to said first polarity, the received battery is charged from said on board battery under control of said microprocessor.

2. The device of claim 1, wherein the energy sources comprise a plurality of the batteries and each of the batteries is one of a plurality of different battery types, and further comprising a plurality of battery compartments wherein each of said battery compartments is configured for receiving each of said different battery types.

3. The device of claim 1, wherein said plurality of energy sources include a USB device, wherein the USB device is discharged into said onboard battery under control of said microprocessor.

4. The device of claim 1, wherein said plurality of energy sources include a solar panel and further comprising a universal input, wherein the solar panel is discharged into said onboard battery via said universal input and under control of said microprocessor.

5. The device of claim 1, wherein said plurality of energy sources include a BB-2590 type battery and further comprising a universal input, wherein the BB-2590 is discharged into said onboard battery via said universal input and under control of said microprocessor.

6. The device of claim 1, wherein the device is further for recharging an external USB device and further comprising at least one USB output connected to the USB device, wherein said onboard battery is discharged into the USB device via said at least one USB output under control of said microprocessor.

7. The device of claim 1, wherein a detector is arranged in each of said compartments for detecting a length of the received battery.

8. The device of claim 7, wherein for each compartment said microprocessor uses said detected length and said output voltage to determine a type of said battery and further wherein said determined battery type is used by said microprocessor to control said discharging and recharging of said battery.

9. The device of claim 7, wherein said length detector is selected from a group comprising a light pipe and a resistance which varies with a length of the received battery.

10. A method for selectively discharging or recharging a battery, the method comprising:
    connecting the battery between a pair of contacts; and
    sensing an orientation of the battery between said pair of contacts;
    wherein when the battery is in a first orientation the battery is discharged to a second battery and when the battery is in a second orientation opposite to said first orientation the battery is recharged by said second battery.

11. The method of claim 10, wherein the battery is discharged and recharged under control of a microprocessor.

12. The method of claim 10, wherein said sensing an orientation comprises sensing a polarity of the battery between said contacts and further wherein a positive polarity between a first of said contacts and a second of said contacts determines said first orientation and a negative polarity between said first of said contacts and said second of said contacts determines said second orientation.

* * * * *